Figure 2:
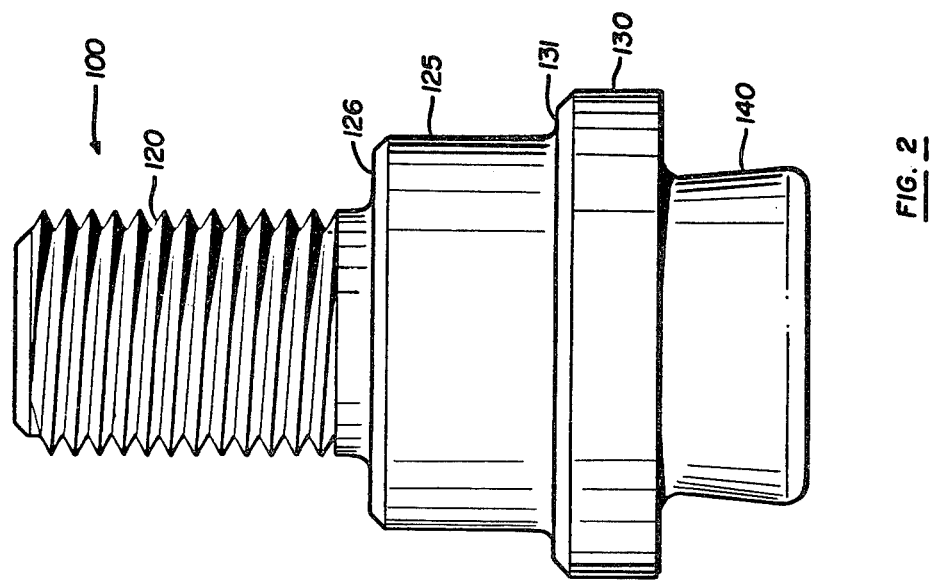

United States Patent [19]

Müller

[11] Patent Number: 4,459,073

[45] Date of Patent: Jul. 10, 1984

[54] FASTENERS WITH PIERCING AND RIVETING PERFORMANCE

[75] Inventor: Rudolf R. M. Müller, Frankfurt, Fed. Rep. of Germany

[73] Assignee: Multifastener Corporation, Detroit, Mich.

[21] Appl. No.: 485,099

[22] Filed: Mar. 28, 1983

Related U.S. Application Data

[62] Division of Ser. No. 229,274, Jan. 29, 1981, Pat. No. 4,409,719.

[30] Foreign Application Priority Data

Feb. 2, 1980 [DE] Fed. Rep. of Germany ....... 3003908

[51] Int. Cl.³ ............................................. F16B 39/00
[52] U.S. Cl. .................................. 411/176; 411/179; 411/166; 29/243.52
[58] Field of Search .................. 29/243.52, 432, 432.1, 29/432.2, 512, 522 A, 716, 795, 796, 811, 818; 411/179, 166, 176, 177, 181, 183, 103, 105, 107, 386, 499; 403/22, 277, 279, 282, 283, 285; 52/587

[56] References Cited

U.S. PATENT DOCUMENTS

| | | | |
|---|---|---|---|
| 2,053,490 | 9/1936 | Novick | 29/432.2 |
| 2,126,161 | 8/1938 | Woodward | 29/432.2 |
| 2,713,197 | 7/1955 | Schmidt | 403/285 |
| 3,095,777 | 7/1963 | Hallock | 29/432 X |
| 3,299,500 | 1/1967 | Double | 29/432.2 |
| 3,393,724 | 7/1968 | Joffe | 29/432 X |
| 3,432,925 | 3/1969 | Woolley | 29/512 X |
| 3,579,802 | 5/1971 | Gajouski | 29/432.2 |
| 3,731,369 | 5/1973 | Johnson | 403/283 |
| 3,754,731 | 8/1973 | Mackal et al. | 29/512 |
| 3,800,401 | 4/1974 | Jesevich et al. | 29/512 X |
| 3,871,264 | 3/1975 | Hallock | 411/499 |
| 3,938,239 | 2/1976 | Lauth | 29/512 |
| 4,004,483 | 1/1977 | Hallock | 411/386 |
| 4,018,257 | 4/1977 | Jack | 29/512 |
| 4,071,949 | 2/1978 | Ross et al. | 29/798 |
| 4,389,766 | 6/1983 | Capuano | 411/179 |

FOREIGN PATENT DOCUMENTS

| | | |
|---|---|---|
| 2013713 | 10/1971 | Fed. Rep. of Germany . |
| 2446888 | 1/1976 | Fed. Rep. of Germany . |
| 2026040 | 9/1970 | France . |

*Primary Examiner*—Wayne L. Shedd
*Attorney, Agent, or Firm*—Cullen, Sloman, Cantor, Grauer, Scott & Rutherford

[57] ABSTRACT

A self-piercing fastener, such as a stud bolt, for attachment to a panel or the like. The fastener includes a fastener portion, such as a threaded shank, and a self-piercing and riveting end portion. The end portion includes a central recess enclosed by a self-piercing and riveting wall on at least opposed sides of the recess. The wall has an internal surface terminating in a sharp piercing edge at its distal end which is adapted to pierce an opening in the panel. The recess terminates in a bottom wall which is preferably spaced from the piercing edge of the wall a distance greater than the thickness of the panel. The fastener recess receives the slug pierced from the panel, which is deformed against the convex midportion of the bottom wall to engage the internal surface of the wall and the wall includes an arcuate drawing surface at the outer distal end adapted to draw the pierced panel edge toward the distal end of the wall as the panel in pierced, forming a mechanical interlock between the fastener and the panel.

13 Claims, 6 Drawing Figures

FASTENERS WITH PIERCING AND RIVETING PERFORMANCE

This application is a divisional application of my U.S. patent application, Ser. No. 229,274, filed Jan. 29, 1981, now U.S. Pat. No. 440,971 issued Oct. 18, 1983.

This invention relates to a stud bolt, the substantially cylindrical body of which consists of a shank, optionally furnished with thread, and of a head at one end of the shank. The invention relates also to an apparatus and to a method for fixing stud bolts of this type to metal sheets, plates, panels and the like.

Known stud bolts of the said type are fitted to metal sheets, plates or panels—hereinafter only "panels" will be referred to, by the stud bolt being weldingly pressed with its head end onto one side of the panel and thus fixed. Furthermore, stud bolts furnished with a head are known, which can be inserted into a panel. These stud bolts are guided through an opening in a preperforated panel and riveted in the region of the head end to the panel. Where these stud bolts are used, considerable assembly difficulties are encountered in respect both of the vertical alignment of the stud bolt to the panel and also the strength to be achieved by the riveted connection. Since this stud bolt moreover can be fitted only into an opening on preperforated panels, at least two operations are necessary for their fixing, namely the preperforation of the panel and the insertion of the stud bolts into this panel. Nevertheless, this riveted fixing of the stud bolts is preferred to the fixing by welding on, since especially in mass production complicated and expensive automatic welding machines can be used only for one moulding each. Moreover, structural changes in the panel material are produced by the local heating during the welding operation.

The task underlying the present invention is to create a stud bolt which makes possible forms of construction which lead to savings, especially in the work sequence in the fixing of the stud bolt to a panel.

On the basis of the general concept of this invention, of imparting to the stud bolt itself riveting performance, this task is achieved in that a piercing portion is disposed at one end of the stud bolt. The piercing portion can be formed at the head end of the stud bolt, preferably on a bearing surface of the head that faces away from the shank, so that after the stud bolt has been inserted into a panel the shank projects out beyond one face of the panel. By the invention the special advantage is obtained that the stud bolt according to this invention can be inserted self-piercingly into the panel, i.e. one operation, namely the preperforation, can be omitted.

If, in a further embodiment of the invention, the piercing portion consists of a coaxial recess and of a riveting wall surrounding the recess, then one end edge of the riveting wall, preferably the end edge nearest to the recess, can be formed as a cutting edge.

Preferably, the piercing and riveting portion is furnished with an external keying wall, tapering from a driving and drawing edge formed on the external periphery of the free piercing portion end surface, towards the head, while a driving and drawing surface oriented approximately perpendicularly to the axis of the stud bolt extends between the cutting edge and the driving and drawing edge. From this there results for the piercing and riveting portion a form which especially facilitates the piercing operation.

The external keying wall can have a transition with a rounded portion into the bearing surface of the head. When the self-piercing stud bolt is being fitted, the riveting wedge outwardly radially deformed by the riveting operation into an L-shape can thus constitute, together with the bearing surface of the head, a peripheral groove on the riveting wedge which snugly seats the surrounding panel material, whereby the rounded forms ensure that notch effects are avoided.

In a further embodiment, the recess is furnished with a bottom which is raised towards the axis of the stud bolt as a function of the thickness of the panel to be equipped with the stud bolt, or projects depressed into the recess. A bottom of raised form ensures that a slug of material that becomes damed in spherical form during punching out from a thin panel is radially expanded by the bottom and deformed to bear firmly against the inner wall of the recess, whereas by a depressed form of the bottom, in the case of a thick panel damage to the point of the counter-die, yet to be explained, as a result of the compression of the slug is avoided. The outer region of the bottom may be situated on approximately the same radial plane as the bearing surface of the head.

In one special embodiment of the self-piercing stud bolt, a guiding and spacing step possessing a pressing surface facing towards the shank may be disposed in an axial extension of the shank on a pressing surface of the head facing towards the shank. This guiding and spacing step proves to be advantageous especially when a desired spacing is to be maintained between two panels. For this purpose, the shank of a stud bolt inserted according to this invention into a panel is guided through a preperforated second panel until this panel bears against the guiding and spacing step and subsequently the projecting portion of the shank is fixed to the second panel, for example riveted or screwed.

In further forms of embodiment, the self-piercing stud bolt of this invention may possess a substantially cylindrical shank and/or may furthermore be provided either with a substantially cylindrical or with a substantially polygonal guiding and spacing step and/or head and/or piercing portion. During the transporting of the stud bolt, for example in a guide of a piercing and riveting apparatus which inserts the stud bolt into a panel, the polygonal head and/or guiding and distance step are advantageously used is orientation aids during a sorting operation, while the polygonal piercing portion permits an especially non-rotating fixing to a panel.

In a preferred embodiment, the shank and/or the guiding and spacing step may possess an external thread, so that use as a self-piercing riveting bolt is possible. Furthermore, a stud bolt equipped preferably with guiding and spacing step may be suitable as a hinge connection, in that for example the shank of a stud bolt inserted into a panel is furnished only over a portion of the shank length with an external thread and a second panel possessing an opening is fixed rotatably movably to this shank portion, for example by means of nuts.

In the fixing of the stud bolt to a panel, the panel may be situated between a pressing die which holds the stud bolt and a female die with counter-hole die, and preferably be perforated simultaneously with the riveting operation. The pressing die contains preferably a seating for shank and/or guiding and spacing step, surrounded by a pressing surface. For example, the self-piercing stud bolt of this invention is inserted with its shank and/or guiding and spacing step into the seating, so that the pressing surfaces of the pressing die and stud bolt bear against each other, while the driving surface of the stud bolt bears against one side face of the panel oriented perpendicularly to the axis of the stud bolt.

In a preferred embodiment, the female die contains, in an extension of the axis of the stud bolt, an axial depression which is connected with the seating surface by a bending radius, and possesses a bottom approximately parallel to the seating surface and comprising a central bore; this bore then contains a cylindrical counter-hole die, which may possess an end penetrating into the depression of the female die. This end of the counter-hole die consists, for example, of a trumeated conical splaying body, the base surface of which may be situated approximately at the level of the bottom of the depression. The splaying body extends preferably as far as a cylindrical cutting projection, which can be radially bounded at the free end face by a cutting edge. Preferably, the cutting projection has a diameter which is adapted to that of the recess of the stud bolt in such a manner that the cutting edges of the stud bolt and of the counter-hole die can co-operate in the perforating of the panel. On the free end face of the cutting projection, a splaying cone is centrally disposed, which may project beyond the plane of the female die seating surface and, when the stud bolt is being inserted into the panel, jams the trepanned slug of material in the recess in the piercing portion of the stud bolt.

Figure 1:
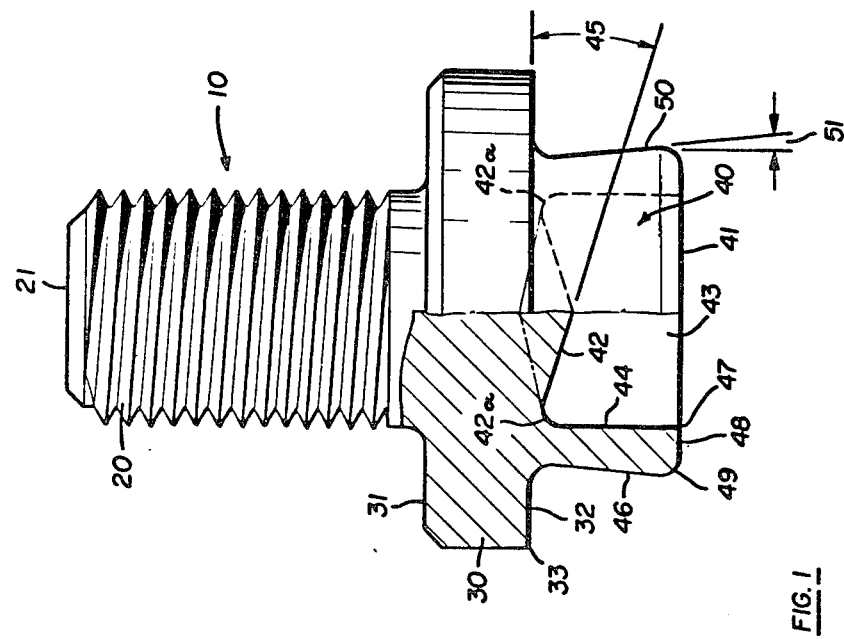
Figure 3:
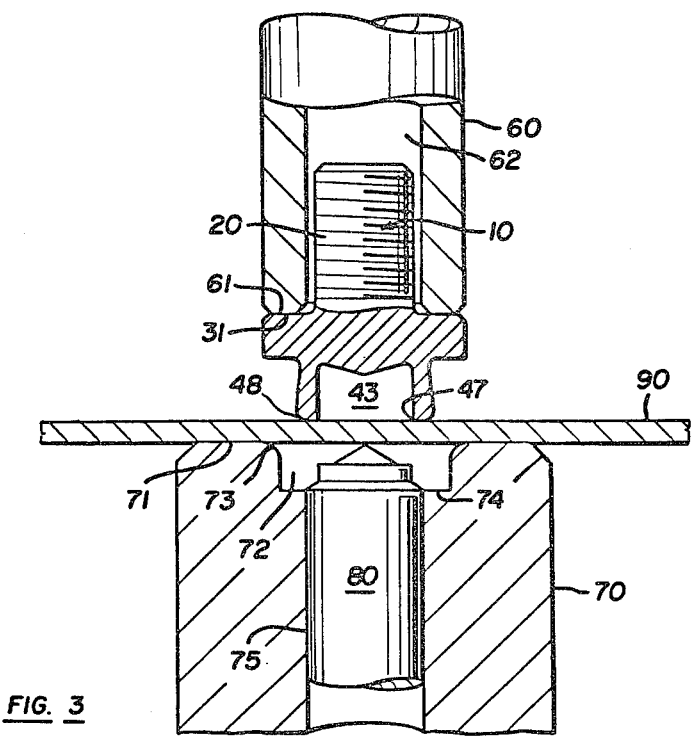
Figure 4:
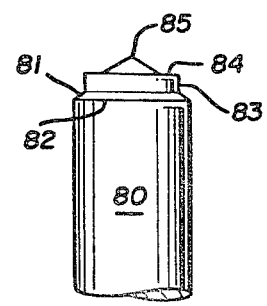
Figure 6:
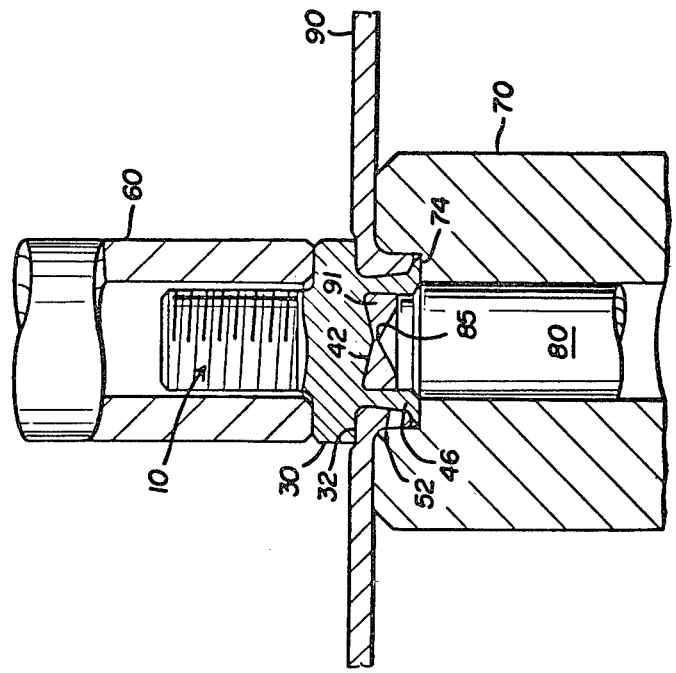
Figure 5:
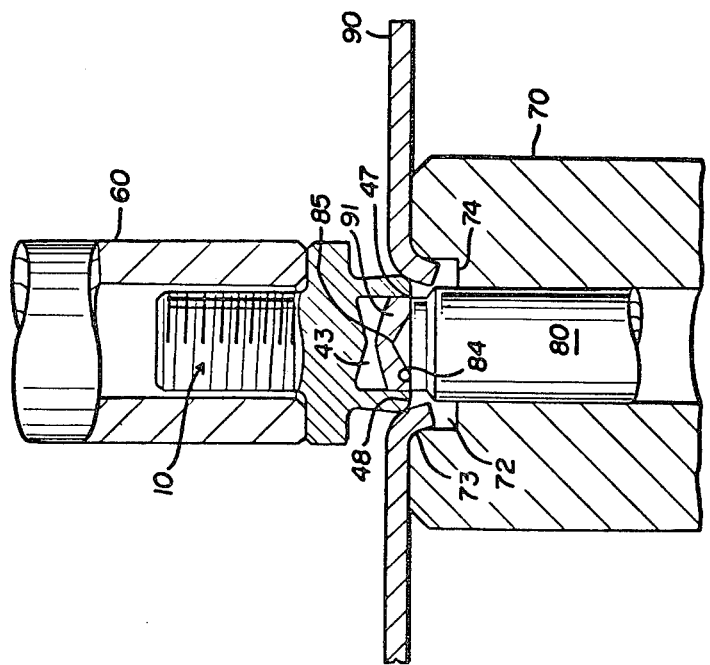

The invention is explained in more detail below with reference to examples of embodiment thereof illustrated in the drawings. The drawings show:

FIG. 1 a self-piercing stud bolt, in partly cut-away lateral view;

FIG. 2 another self-piercing stud bolt, constructed as a screw with guiding and spacing step;

FIG. 3 a partially cut away lateral view of the stud bolt of FIG. 1 and one form of embodiment of a piercing and riveting apparatus;

FIG. 4 a detail of the piercing and riveting apparatus of FIG. 3;

FIG. 5 the connecting element of FIG. 1 and the piercing and riveting apparatus of FIG. 3 in partially cut away lateral view for explaining the method according to this invention; and FIG. 6 the arrangement illustrated in FIGS. 3 and 5 after the fitting of the stud bolt on a panel, in partly cut away lateral view.

The self-piercing stud bolt according to this invention is especially suitable for permanent fixing to a plate or panel, especially a metal sheet or the like; hereinafter, reference will be made only to a "panel" without any limiting meaning. The stud bolt and the piercing and riveting apparatus intended preferably for its processing are suitable especially also for use in a conventional press, in which the panel is formed. With each stroke of the press, a number of self-piercing stud bolts can then be connected to the panel.

FIG. 1 shows a self-piercing stud bolt, which is constructed as a self-piercing riveting bolt 10. This riveting bolt 10 consists essentially of a cylindrical shank 20, furnished with external thread, of a head 30 extending radially outwards at one end of the shank, and of a cylindrical piercing and rivating portion 40, situated in an extension of the shank axis on the side of the head 30 remote from the shank 20.

In detail, the head 30 is situated on the end surface opposite to the free shank end 21 and is furnished on one side with a pressing surface 31, surrounding in annular manner the end surface, and on the other side with a bearing surface 32, surrounding in annular manner the piercing and riveting portion 40 and situated opposite to the pressing surface 31. The bearing surface 32 is radially bounded by a stamping edge 33. The piercing and riveting portion 40 possesses, in the free piercing portion end face 41, a central recess 43, tapering slightly conically to a bottom 42. The raised bottom 42 extends from the internal wall 44 of the recess 43 at an angle 45 obliquely towards the axis of the riveting bolt 10. The external region 42a of the conical bottom 42 and the bearing surface 32 lie approximately in the same plane. The dot-and-dash line illustrates the already mentioned recessed form of construction of the bottom for comparatively thick panels.

The recess 43 is surrounded by an annular riveting wall 46, which possesses, at the piercing portion end face 41, a cutting edge 47 which bounds the recess 43 and an annular driving and drawing surface 48. The driving and drawing surface 48 is oriented perpendicularly to the axis of the riveting belt 10 and is connected with the external keying wall 50 by a rounded driving and drawing edge 49. The keying wall 50 tapers from the driving and drawing edge 49 towards the head with a clearance angle 51, relative to the axis of the riveting bolt 10, and loads with a rounded portion into the bearing surface 32 of the head 30.

A further embodiment of the self-piercing connecting element is illustrated as a self-piercing riveting screw 100 in FIG. 2 and differs from the above described riveting screw 10 in that a cylindrical guiding and spacing step 125 is disposed on the axis of the riveting screw 100 between the end face of a shank 120, furnished with external thread, and a head 130. This guiding and spacing step 125 possesses a pressing surface 126, surrounding the end of the shank 120 in annular manner, and has a transition at a shoulder into an adjacent pressing surface 131 of the head 130.

The piercing and riveting apparatus according to FIG. 3 consists of a pressing die 60 and a female die 70 with counter-hole die 80. The pressing die 60, a component of a complex, automatic sorting out system, is furnished with a searing or recess 62 for the shank 20, surrounded by a pressing surface 61. A self-piercing riveting screw or riveting bolt 10 according to FIG. 1 is disposed with its shank 20 in the seating 62, so that the pressing surface 61 of the pressing die 60 and the pressing surface 31 of the riveting screw 10 bear against each other and the driving and drawing surface 48 of the riveting screw 10 bears against one side face of a panel 90.

This panel 90 is disposed perpendicularly to the axis of the riveting screw 10 and rests on the seating surface 71 of female die 70. The female die 70 contains, on the continued axis of the riveting screw 10, an axial depression 72, which is connected with the seating surface 71 by a bending radius 73. The depression 72 possesses a bottom 74, which extends parallel to seating surface 71 and is furnished with a central bore 75.

In this bore 75 there is situated a cylindrical counter-hole die 80. One end of the counter-hole die 80 penetrating into the depression 72 of female die 70 is illustrated in FIG. 4 and consists of a truncated conical splaying body 81, the base 82 of which is situated at approximately the level of the bottom 74 of depression 72 and which extends as far as a cylindrical cutting projection 83. This cutting projection 83 possesses a diameter adapted to the recess 43 of riveting screw 10 and is radially bounded at the free end face by a cutting edge 84, which co-operates with cutting edge 47 of riveting screw 10 when the panel 90 is being perforated. Furthermore, the cutting projection 83 possesses a central splaying cone 85 on its free end surface, which amongst other things ensures that during the first contact between self-piercing stud bolt, panel and counter-hole die, lateral relative movements are no longer possible.

An intermediate stage of the process of inserting a riveting screw 10 according to FIG. 1 by means of a piercing and riveting apparatus according to FIG. 3 into the panel 90 is illustrated in FIG. 5.

At the relative approach towards one another of pressing die 60 with the self-piercing riveting screw 10 on the one hand and the female die 70 with counter-hole die 80 and panel 90 on the other hand, the portion of the panel covering the depression 72 in the female die is deformed inwards by the driving and drawing surface 48 of the riveting screw 10 around the bending radius 73 into the depression 72 of female die 70. The panel 90 is then sheared between the cutting edge 47 of the riveting screw 10 and the cutting edge 84 of the counter-hole die 80 and thereby a slug 91, corresponding in diameter to the recess 43 of riveting screw 10, is punched or trepanned out from the panel 90. This slug 91, domed over the splaying cone 85 of the counter-hole die 80, is pushed during the further movement of splaying cone 85 into the conically tapering recess 43.

Furthermore, the riveting wall 46 of the riveting screw 10 is pressed against the (cylindrical) wall surface of the splaying body 81 on the counter-hole die 80 and is deformed radially outwards in L-shape onto the bottom 74 of the female die depression 72, so that the L-shaped riveting wall 46 forms, together with the bearing surface 32 of the head 30, a peripheral groove 52 on the riveting wall 46. Subsequently, the portion of the panel 90 deformed into the female die depression 72 is deformed inwards into this peripheral groove 52.

At the same time, the cut-out slug 91 according to FIG. 6 is pressed by the splaying cone 85 onto the conically raised bottom 42 of the recess 43 in the riveting screw 10. The splaying cone 85, like the bottom 42, is then pressed centrally into the slug 91 and the latter is consequently radially outwardly deformed and thus firmly jammed in the recess 43. FIG. 6 shows furthermore that the bearing surface 32 of the riveting screw 10 is pressed into the adjacent side of the panel 90. During this pressing-in, the riveted connection of the riveting wall 46 and the panel 90 is upset. The riveting wall 46 consequently lies between the externally bearing panel material 90 and the slug 91, jammped in the recess 43. The riveting screw 10 is thus firmly and especially non-rotatably mounted on the panel 90, without additional securing measures or special forming operations being required, whereby the time-saving fixing cycle, which requires only one operation, should be especially emphasized.

I claim:

1. A self-piercing fastener for attachment to a panel or the like,
   said fastener having a fastener portion a head portion terminating in and a self-piercing and riveting end portion,
   said self-piercing and riveting end portion having a central recess enclosed by a self-piercing and riveting wall on at least opposed sides of said recess,
   said self-piercing and riveting wall having an internal surface adjacent said recess terminating in a relatively sharp piercing edge adjacent its distal end,
   said piercing edge adapted to pierce an opening in said panel,
   said recess terminating in a non-plannar bottom wall spaced from said wall distal piercing edge a distance greater than the thickness of said panel,
   said recess adapted to receive the slug pierced from said panel which is deformed against said bottom wall midportion to deform said slug against said wall internal surface,
   and the outer distal edge of said self-piercing and riveting wall including an arcuate drawing edge adapted to draw the pierced panel edge toward said distal end as the panel is pierced by said piercing edge,
   thereby, to retain said self-piercing and riveting end portion in said pierced panel opening.

2. The self-piercing fastener defined in claim 1, characterized in that
   said self-piercing and riveting wall is generally annular and surrounds said recess,
   and said recess bottom wall midportion being generally conical.

3. The self-piercing fastener defined in claim 2, characterized in that
   said fastener self-piercing and riveting end portion includes an enlarged head portion located between said fastener portion and self-piercing and riveting wall,
   said enlarged head portion having an annular pressing surface adjacent said fastener portion and an annular bearing surface adjacent said self-piercing and riveting wall adapted to bear against said panel after installation of said fastener.

4. A self-piercing and attaching bolt for attachment to a panel,
   said bolt including a threaded shank portion and a head portion terminating in an integral self-piercing and riveting end portion,
   said self-piercing and riveting end portion including a central recess generally axially aligned with said bolt enclosed by a generally annular self-piercing and riveting wall,
   the internal surface of said generally annular wall terminating in a relatively sharp piercing edge at the distal end adjacent said recess which is adapted to pierce a slug from said panel,
   said recess adapted to receive said pierced panel slug and said recess terminating in a an apeannar bottom wall having a central portion adapted to receive said pierced panel slug,
   said slug deformed against said bottom wall central portion and against said internal wall surface,
   and said self-piercing and riveting end portion including self-attachment means retaining said end portion in the pierced panel opening.

5. The self-piercing and attaching bolt defined in claim 4 characterized in that
   the outer distal edge of said generally annular self-piercing and riveting wall defining a convex arcuate drawing surface adapted to draw the pierced panel edge towards said distal end, retaining said self-piercing and riveting end portion in the pierced panel opening.

6. The self-piercing and attaching bolt defined in claim 4, characterized in that
   said bolt includes an enlarged head portion located between said threaded shank portion and said generally annular self-piercing and riveting wall, said enlarged head portion having a pressing surface adjacent said threaded shank and a bearing surface on opposed sides of said generally annular wall adapted to bear against said panel after installation of said bolt.

7. The self-piercing and attaching bolt defined in claim 6, characterized in that
said enlarged head portion is annular and said pressing and bearing surfaces extend generally perpendicularly to said threaded shank portion and said generally annular wall.

8. A metal stud member adapted to permanent attachment to a plate which is adapted to be supported on a female die, said stud member comprising a shank and a head at one end of said shank, said head terminating in a non-hardened annular piercing and riveting portion having an open-end portion, said open-end portion having an inner surface and an outer end surface, said annular portion having an outer surface and a recess with said recess terminating in a generally non-planar bottom wall bridging said annular portion, a piercing surface adjacent to the inner surface of said open-end portion adapted to pierce a slug from a plate having a thickness less than the length of said annular portion, said open-end portion adapted to receive said plate slug as said annular piercing and riveting portion penetrates said plate, and said slug being deformed against said bottom wall of said recess, the outer end surface of said open-end portion including an arcuate drawing surface adapted to draw said plate into a female die supporting from said piercing surface to the outer surface of said annular piercing and riveting portion.

9. The stud member defined in claim 8, characterized in that said stud member head includes a radial flange portion adjacent said annular piercing and riveting portion having a bearing surface extending transversely from said annular portion adapted to bear against said plate.

10. The stud member defined in claim 8, characterized in that said shank includes a radially enlarged spacing portion terminating in a male threaded cylindrical stud portion, said spacing portion having a seating surface adjacent said stud portion extending transversely to the axis of said stud portion.

11. The stud member defined in claim 8, characterized in that said recess bottom wall is convex to accommodate thin plates, wherein said panel slug is compressed against said convex bottom wall for deforming said panel slug radially outwardly against the innter surface of said annular piercing and riveting portion.

12. A self-piercing and riveting member for attachment to a panel, said member having a body portion, a head portion and a self-piercing and riveting annular wall extending from said head portion, said body portion including a radial flange portion joined to said annular wall in an arcuate surface, said annular wall having a free end spaced from said body portion, an outer surface and a generally smooth inner surface, a piercing surface adjacent said annular wall inner surface free end for piercing a slug from said panel, said annular wall inner surface terminating in a bottom wall bridging said annular wall and defining a socket opening through said annular wall free end for recept of said panel slug, and said annular wall free end joined to said outer surface in an arcuate drawing surface for deforming said panel, and said socket bottom wall being conical and convex for permitting attachment of said member to relatively thin panels wherein said panel slug is compressed against said convex bottom wall, deforming said panel slug radially outwardly against said annular wall inner surface.

13. The self-piercing and riveting member defined in claim 12, characterized in that said member body portion includes a cylindrical stud portion said stud portion extending from said flange portion opposite said annular wall in generally coaxial alignment.

* * * * *

UNITED STATES PATENT OFFICE
CERTIFICATE OF CORRECTION

Patent No. 4,459,073  Dated July 10, 1984

Inventor(s) Rudolph R.M. Muller

It is certified that error appears in the above-identified patent and that said Letters Patent are hereby corrected as shown below:

On the title page,
    Column 1, [62], cancel "Pat. No. 4,409,719"
        and substitute "abandoned"

Signed and Sealed this

Twelfth Day of March 1985

[SEAL]

*Attest:*

DONALD J. QUIGG

*Attesting Officer*    Acting Commissioner of Patents and Trademarks